Nov. 8, 1949     K. J. PTASNIK     2,487,061
ADHESIVE TRANSFER TAPE DISPENSER
Filed July 31, 1945
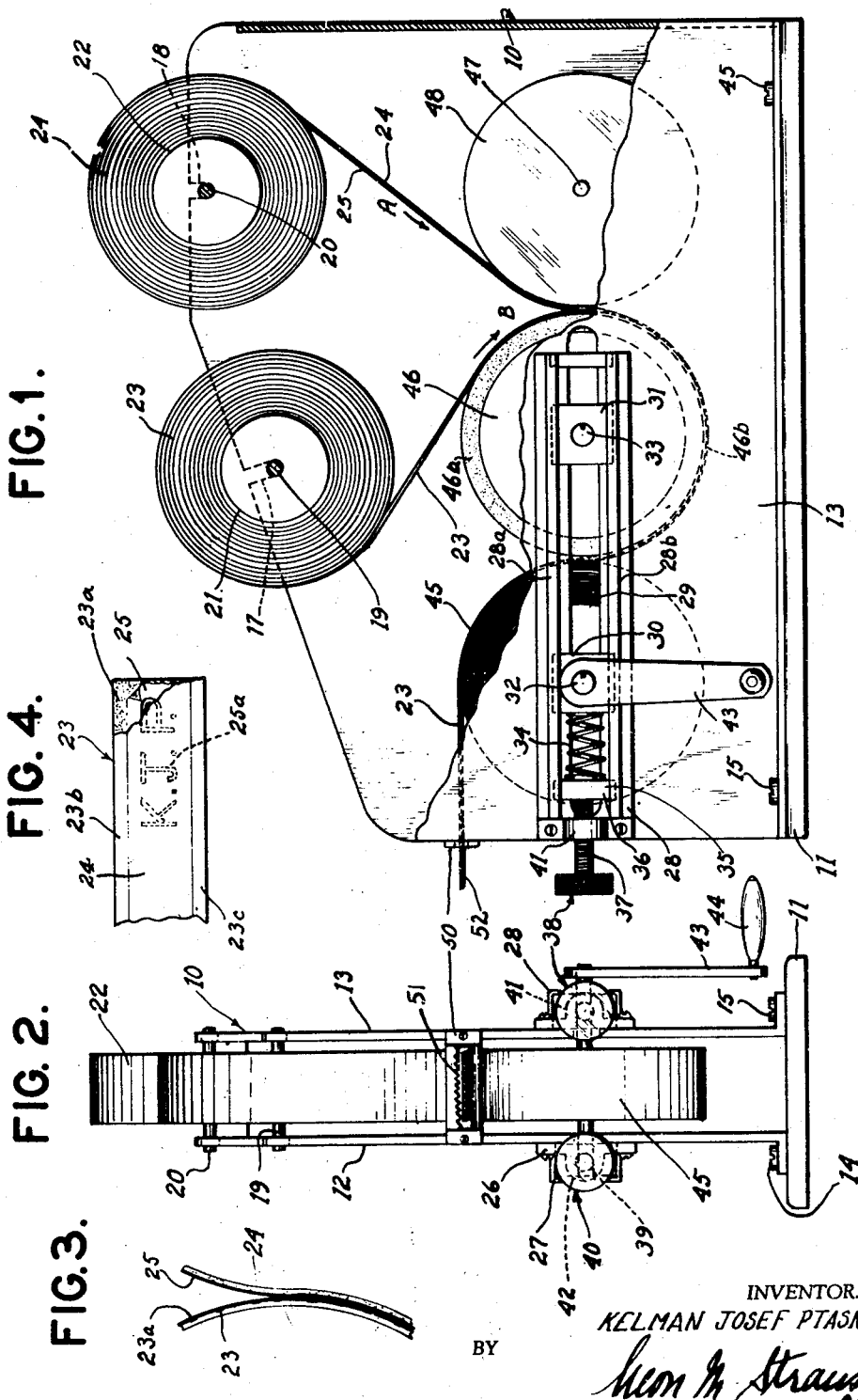
INVENTOR.
KELMAN JOSEF PTASNIK.
BY Patented Nov. 8, 1949

2,487,061

UNITED STATES PATENT OFFICE 2,487,061

ADHESIVE TRANSFER TAPE DISPENSER

Kelman Josef Ptasnik, New York, N. Y.

Application July 31, 1945, Serial No. 607,949

2 Claims. (Cl. 41—1)

This invention relates to improvements in or relating to pressure-sensitive adhesive and transparent tape structures and means for dispensing the same.

Adhesive tapes or similar carriers of the aforesaid type generally consist of a cellulosic base, such as paper, or of a material derived from a cellulose plastic composition, such as cellulose acetate, cellulose nitrate, cellulose ethylate, cellulose benzylate, etc. or may be made from a synthetic resin plastic mass, e. g. of the vinyl resin group or hydroxy-carboxylic resin group and resinous products of the hydrochloric or other synthetic rubber groups.

Such bases or carriers are transparent and are coated with a pressure-sensitive adhesive layer which may consist of mixtures of natural rubber or synthetic rubber with resins and apportionate additions of plasticizers, waxes, etc. to keep said adhesive layer substantially permanently tacky.

The present invention more particularly deals with the manufacture of pressure-sensitive adhesive, transparent tapes, labels or carriers combined with decorative or advertising matters.

It is one of the objects of the present invention to provide means for transferring indicia, such as advertising or decorative matter to and for incorporation of the same in pressure-sensitive adhesive tape structures of the transparent type.

It is another object of this invention to provide means for intermittently transferring indicia on pressure-sensitive adhesive, transparent tapes or carriers.

A further object of the present invention is to provide means facilitating the movement of a pressure-sensitive adhesive, transparent tape relatively to and past an indicia supporting carrier for transfer of said indicia onto said pressure-sensitive adhesive, transparent tape.

A still further object of the present invention is to provide means for instantaneously changing the indicia to be applied to pressure-sensitive adhesive, transparent tapes.

Still a further object of the present invention is to provide means for interchangeably receiving and conducting the pressure-sensitive adhesive, transparent tape and for interchangeably receiving and conducting an indicia supporting carrier in predetermined relation to said tape in a portable device which is simple in construction and which may be readily employed even by retailers without necessitating any complicated installations.

Yet another object of the present invention is to provide means for incorporating in pressure-sensitive adhesive, transparent tapes indicia without substantially reducing the adhesive faculty of said tapes.

Still another object of this invention is to provide means for applying indicia to any commercially available transparent and pressure-sensitive adhesive tapes and to thereby enhance the advertising possibilities without markedly impairing flexibility, purpose and faculty of the tape structure which it has primarily to fulfill.

Other objects, features and advantages will appear from the ensuing description of the invention and the accompanying drawing showing some embodiments of the invention, but it is understood that the latter is not confined to the exact characteristics shown, as various changes may be made within the scope of the appended claims.

In the drawing:

Fig. 1 shows a side-elevational view of a device (parts being broken away) for producing and dispensing pressure-sensitive adhesive tape of the transparent type in accordance with this invention.

Fig. 2 is an end view of the device shown in Fig. 1.

Fig. 3 is a detail, side-elevational view of a portion of a tape and an indicia supporting carrier as employed in this invention.

Fig. 4 is a fragmentary view of a transparent pressure-sensitive adhesive tape made in accordance with this invention.

Referring now more in particular to the drawing, there is shown in Fig. 1 a portable device 10 having a base 11 and spaced upright walls 12 and 13 which are fixed by means of screws 14 and 15, respectively, to said base plate 11. Within suitable pairs of slots 17 and 18 provided in side walls 12 and 13, respectively, rest spindles 19 and 20 carrying reels 21 and 22, respectively. Reel 21 is provided with a roll of endless tape 23 of the transparent type and provided with a pressure-sensitive adhesive layer, whereas reel 22 carries a roll of a flexible preferably cellulosic material in the form of a tape 24 carrying a printed film layer 25.

Fixed, as at 26, on the outer surface of upwardly extending side wall 12 is a bearing frame 27. Similar to bearing frame 27 there extends a frame 28 in substantially horizontal direction lengthwise of and on the outer surface of upwardly extending side wall 13. Both bearing frames 27 and 28 are of identical construction, so that it will only be necessary to describe one of them in greater detail. Bearing frame 28 is slotted at 29 and slidably conducts two bearing blocks 30 and 31 within upper and lower tracks 28a and 28b. These bearing blocks 30 and 31 carry, respectively, the ends of spindles 32 and 33 passing through slotted side walls 12 and 13 to extend into similar bearing blocks slidably arranged in bearing frame 27. Against bearing block 30 presses a coiled spring 34 which extends to and may be connected with a sliding element 35 adapted for to and fro movement within bearing frame 28. Against surface 36 of element 35 abuts an adjusting or set screw 37 provided with a knurled head 38. A similar adjusting screw provided with head 40 is arranged in bearing frame 27 and designated by numeral 39.

The threaded portion of the adjusting screw 37 extends through and threadedly engages lug 41 whereas the bolt of adjusting screw 39 threadedly engages lug 42 provided at the end of bearing frame 27.

As can be seen in Fig. 1, spindle 32 is fixedly connected with a crank 43 having a handle 44 whereby said spindle may be turned in a desired direction.

As can be easily realized from Figs. 1 and 2, rollers 45 and 46 which are respectively supported by spindles 32 and 33 can be adjusted with respect to each other by means of the aforesaid spring-sliding element-set screw arrangement 34—35—37. Since a similar arrangement is provided on the left hand side of the device 10 along side wall 12, spindles 32 and 33 may be equally displaced with respect to each other to bring about a predetermined pressure between rollers 45 and 46.

Below reel 22 and journalled in side walls 12 and 13 is a spindle 47 carrying idler 48 which is designed to conduct tape 24 running in downward direction from reel 22 according to arrow A.

This tape 24 may be made from any suitable material of plastic composition, such as known in the trade as "cellophane," adapted to carry a removable film having imprinted indicia thereon or part or parts of the film may constitute the indicia itself.

Tape 23 in the form of a conventional Scotch tape (having a transparent base with a continuous pressure-sensitive adhesive layer), is moved in the direction of arrow B with its adhesive layer facing the film layer of tape 24. Tape 23 has a width preferably twice the width of tape 24 or of the film layer carried by the latter. The pressure exerted by the yieldable layer 46a of wheel 46 against tapes 23 and 24 which meet in superposed position to each other at the location between said yieldable cushion 46a and idler wheel 40a which is made from steel or like hard surface, causes the film and/or indicia carried by tape 24 to be transferred onto and held in position by the adhesive layer of tape 23 which together with the remainder of tape 24 follows a portion of the periphery 46b of wheel 46 until the superposed portions of tapes 23 and 24 are trained over roller or wheel 45 on which tape 24 is being wound up. The pressure between wheels 45 and 46 may be readily regulated by means of set screws 37, 38 and 39, 40 as hereinabove explained. Tape 23 is then conducted to a dispenser station 50 at which it is discharged from the device 10. Fig. 4 shows a portion of the tape 23 having embedded in the adhesive layer 23a the film layer 25 with indicia 25a.

As hereinabove mentioned, the tape 24 is preferably made from plain "cellophane" as it is commercially available in predetermined widths.

Upon one of the faces of the "cellophane" strip, there is provided a coating in the form of an extremely fine film which may be prepared from a solution containing about 15% by weight of nitro-cellulose dissolved in approximately 85% by weight of acetone-ethyl acetate solution to which may be added about 0.2% by weight tricresyl phosphate which contributes to the production of a very smooth finished film which comes readily off or can be easily peeled off from its "cellophane" base.

Pigments, such as zinc-oxide, may be added to obtain a rather opaque film and coloring matter may also be included in the aforesaid coating to vary its appearance. The film may further contain ordinary printing ink and can be easily caused for transfer from the "cellophane" strip 24 onto the adhesive layer 23a of tape 23 for incorporation in the latter.

Instead of using the film as an intermediary between the strip 24 and indicia 25a, the "cellophane" base or strip may be directly printed or provided with the indicia 25a produced with commercial aniline ink containing a slight amount of water to avoid penetration into said base, and further comprising a solution consisting of about 90% by weight of acetone to which may be added a small amount of about 0.2% by weight of triphenyl phosphate as a softening agent. Any suitable binders may be added in order to avoid blurring or bleeding of the indicia thus printed on the "cellophane" strip.

It has been found in practice that the "cellophane" strip prepared with the aforesaid film and indicia as hereinabove set forth, readily releases said film with the indicia upon exertion of pressure of said film and/or indicia against the pressure-sensitive adhesive layer of the tape 24.

Since tape 23 is wide enough to receive film 25 with indicia 25a centrally of tape 23, margins 23b and 23c will remain to bring about adherence of the adhesive tape 23 to any desired object. Film 25 which is preferably transparent allows that the indicia 25a imprinted thereon are exposed to view and visible through the transparent base of tape 23.

It is well understood that any mechanical means (not shown) may be provided to cause winding up of tape 24 on roller 48, whereas film 25 together with the indicia 25a after being transferred onto the adhesive layer 23a of tape 23 will be conducted to the outlet 50 of the dispenser. A serrated blade 51 may be provided at 50 to facilitate severance of the extending portion 52 of the tape 23 from the remainder thereof.

It will be realized that instead of using a "cellophane" base 24, the same may consist of an endless, exceedingly thin tissue strip having incorporated therein indicia to be employed for the purpose of this invention. This tissue paper or other cellulosic material having fine or wide mesh may be entirely incorporated in the adhesive layer 23a of tape 23, thus the tissue strip fulfills the function of the "cellophane" base 24 with the hereinabove mentioned film 25.

It is further possible to only transfer the indicia from a suitable base onto the adhesive layer of tape 23 and to select for said indicia a printing ink material which may be akin to the adhesive layer ingredients so that the indicia incorporated in the adhesive layer will not fully impair at its location the adhesive power of tape 23.

The device herein referred to is light in weight and can be subjected to various modifications. However, it is to be kept in mind that a conventional adhesive tape structure of the transparent type when supplied to the dispensing device may be readily and without any difficulties provided with advertising matters from a supply source and that these advertising matters may be instantaneously changed or replaced to vary the advertising subject for incorporation in the adhesive tape to be dispensed from the device 10.

It is well understood that the advertising indicia here under consideration should be extremely thin, ordinary printing thickness being held adequate. The thickness of the film herein referred to often depends on the ingredients used for its formation. If, e. g., pigmented films have to be produced, the film might be relatively thicker than if only cellulosic film is required. The nature of the applied adhesive layer also plays a role in the determination of the film thickness and/or thickness of indicia employed.

While the application of the film and/or indicia onto the adhesive layer of the tape occurs, according to the present invention, after the manufacture of the adhesive tape or label, it is well understood that such application may be had also in the course of the manufacture of the adhesive tape or label structure.

As a further advantage of the new tape structure in combination with advertising matter incorporated therein is to be mentioned that the structure remains substantially as flexible as before said incorporation takes place so that handling and manipulation of the tape structure after said incorporation remains easy and substantially unchanged.

It can thus be seen that there has been provided according to the present invention a device which brings about the incorporation of indicia in a conventional adhesive tape structure which indicia are readily transferred to said structure and become discernible through the transparent base thereof, while the adhesive layer of the tape structure substantially maintains its adhesive faculty.

Having thus described the invention, what is claimed as new and desired to be secured by Letters Patent, is:

1. A device of the character described comprising means for holding a supply of endless adhesive tape, means carrying indicia, means for joining together in superposed position said adhesive tape with the adhesive layer thereof facing the indicia on said carrying means, means for exerting pressure between said adhesive tape and said indicia carrying means to thereby transfer said indicia onto said tape, means conducting said tape with said indicia thereon for dispensing purposes, and means for regulating said pressure between said adhesive tape and said indicia carrying means.

2. A device of the character described comprising two spaced apart upright walls, a base connecting said walls, said walls being provided with a plurality of slots, respective reels positioned between said walls and including shafts, respectively journalled in said slots, one of said reels carrying an endless strip of material, indicia provided on said strip of material, the other reel being adapted to carry an endless tape with an adhesive layer, respective means for conducting said adhesive tape and said strip of material to join said strip and said adhesive tape in superposed position and with said indicia facing the adhesive layer of said tape, means conducting said joined adhesive tape and strip of material for dispensing purposes, whereby said adhesive tape has incorporated in its adhesive layer said indicia, and means facilitating separation of said joined adhesive tape from said strip of material.

KELMAN JOSEF PTASNIK.

REFERENCES CITED

The following references are of record in the file of this patent:

UNITED STATES PATENTS

| Number | Name | Date |
| --- | --- | --- |
| 1,303,857 | Wyckoff | May 13, 1919 |
| 1,483,780 | Catala | Feb. 12, 1924 |
| 1,966,942 | Atkinson | July 17, 1934 |
| 2,107,603 | Ellenburg | Feb. 8, 1938 |
| 2,255,953 | Vergobbi | Sept. 16, 1941 |
| 2,302,179 | Bronfman | Nov. 17, 1942 |
| 2,307,406 | Howard | Jan. 5, 1943 |
| 2,401,841 | Singer | June 11, 1946 |
| 2,404,073 | Karfiol | July 16, 1946 |
| 2,424,486 | Miller | July 22, 1947 |